R. HERMAN.
FLUID CHARGING VALVE.
APPLICATION FILED JULY 1, 1915.
1,215,151.
Patented Feb. 6, 1917.
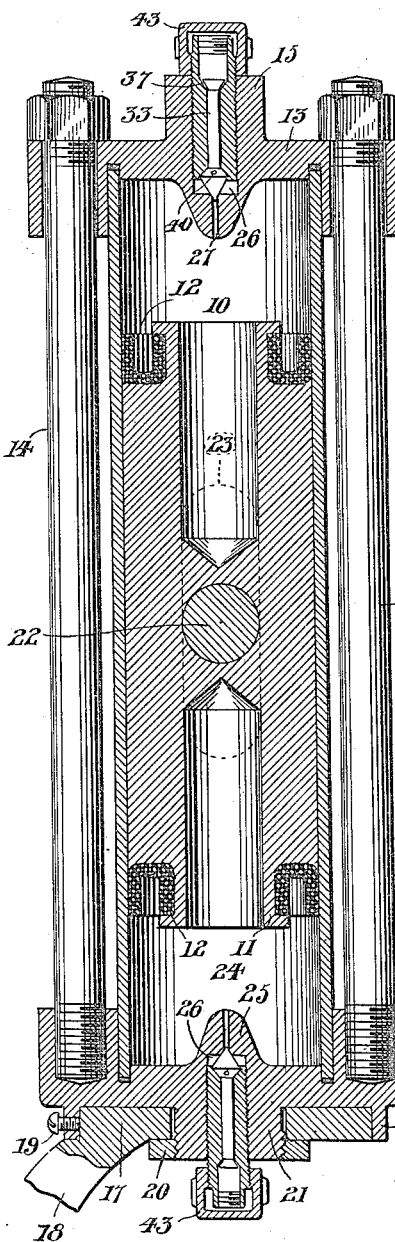
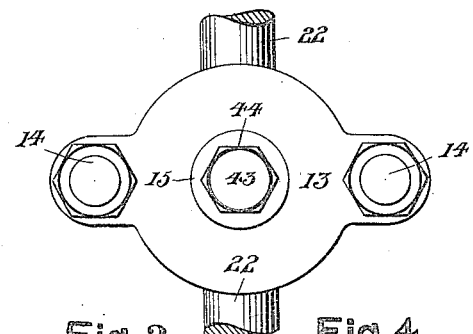
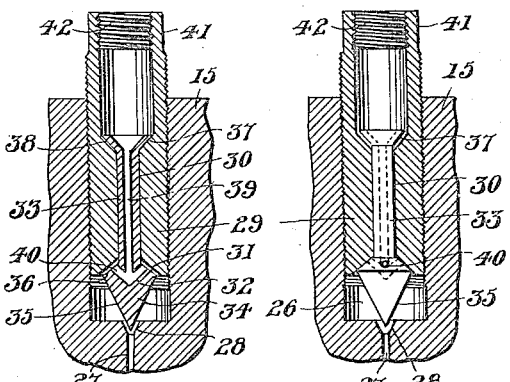
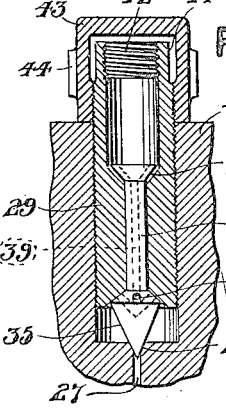
Inventor
R. Herman
By A. M. Wilson,
Attorney.

UNITED STATES PATENT OFFICE.

REINHOLD HERMAN, OF PITTSBURGH, PENNSYLVANIA.

FLUID-CHARGING VALVE.

1,215,151.

Specification of Letters Patent.

Patented Feb. 6, 1917.

Application filed July 1, 1915. Serial No. 37,518.

*To all whom it may concern:*

Be it known that I, REINHOLD HERMAN, a citizen of the United States, residing at Crafton Station, Pittsburgh, in the county of Allegheny and State of Pennsylvania, have invented certain new and useful Improvements in Fluid-Charging Valves, of which the following is a specification.

This invention relates to certain new and useful improvements in fluid charging valves.

The primary object of this invention is the provision of a charging valve for fluid containers and reservoirs capable of allowing an increase and decrease of the pressure therein at will and having a floating member adapted to be mechanically locked against the pressure of the charged fluid within the container or reservoir.

Another object of this invention is the provision of a non-leaking entrance valve for fluid containers such as air reservoirs and especially those which are subject to excessive and varying degrees of contained air pressure.

A further object is to provide a valve structure having opposite inlet and outlet seats, the area or contact for the outgoing fluid being greatly in excess of the area actively engaged by the incoming fluid and whereby the valve is maintained normally closed against exit by any slight excess of contained pressure over the normal atmospheric pressure.

A still further object of the device is to provide a non-leaking valve at opposite ends of a piston-carried pneumatic cylinder and whereby the degree of air pressure at the opposite sides of the piston may be accurately established and then quickly and securely sealed for the normal maintenance thereof.

By the present arrangement it is also designed to provide a recharging valve for a fluid container having double ground seats, the valve member being normally retained closed against exit solely by the pressure of the contained fluid although releasable at will for allowing the escape thereof and having a positive lock for the valve member in its fluid-tight engagement with both of the said valve seats.

With these general objects in view and others that will appear as the nature of the invention is better understood, the same consists in the novel combination and arrangement of parts hereinafter more fully described, illustrated in the accompanying drawings, and pointed out in the appended claims.

In the drawings forming a part of this application and in which like-designating characters refer to corresponding parts throughout the several views, Figure 1 is a central longitudinal sectional view of a pneumatic shock absorber provided with one of the present devices at each of the opposite ends thereof.

Fig. 2 is a top plan view thereof.

Fig. 3 is an enlarged central longitudinal sectional detail view of the charging valve with the elements in their charging positions, and with the cap removed.

Fig. 4 is a similar view with the elements in their charged positions.

Fig. 5 is a similar view with the cap in position and with the valve member locked closed, and Fig. 6 is a top plan view of the valve elements removed from the casing.

While the present valve is designed for general application, it is especially adapted for pneumatic cylinders and is illustrated in Fig. 1 in connection with a shock absorber for vehicles which embodies a tubular cylinder 10 having a piston 11 slidably mounted therein and provided with pneumatic packings 12 at its opposite ends, while head plates 13 are maintained upon the opposite ends of the cylinder by means of longitudinally arranged side bolts 14.

Each of the cylinder heads 13 is provided with an axially arranged external boss 15 arranged for containing the valve mechanism, while the boss of one of the heads 13 is provided with an annular flange or collar 16 concentric with the boss 15 carried thereby and adapted to position the ring portion 17 of a mounting bracket 18 between the said collar and boss. The said bracket ring 17 is maintained in position by means of one or more set screws 19 carried by the flange 16 and also by a lock nut 20 screw-threaded upon the externally threaded portion 21 of the said boss 15. It will be understood that the piston 11 carries a transverse pin 22 extending therethrough and also through opposite longitudinally arranged slots 23 in the wall of the cylinder 10 and whereby the piston is adapted to be coupled to a body or load to be cushioned, while the piston is capable of longitudinal movement within the limits of the slots 23, the opposite end portions 24 of the cylinder chamber being filled with fluid to a desired degree of pressure.

The heads 13 are provided with axially arranged inwardly extending substantially dome-shaped projections 25, while internally threaded valve chambers 26 are arranged in the form of axial bores extending through the boss 15, heads 13 and into the adjacent projection 25. Axially arranged ports 27 extend through each of the projections 25 connecting the valve chambers 26 with the piston chamber portions 24, while the outer ends of the ports 27 are ground to a slightly funnel-shaped valve seat 28 adjacent the chambers 26. A barrel or valve cage 29 is screw-threaded within the chamber 26 of each valve structure and is provided with an axial bore 30 extending therethrough and provided with an outwardly flaring valve seat 31 ground into the inner end of the barrel 29, while an arrow-shaped valve member 32 has its cylindrical shaft portion 33 slidably positioned within the said barrel and bore and having its inwardly arranged head 34 provided with a conical end 35 adapted for seating upon the afore-mentioned valve seat 28, while the opposite tapered surface 36 at the base of the head is adapted for similarly seating upon the barrel valve seat 31 in fluid-tight engagement therewith.

The barrel bore 30 has an enlarged outer end portion 35 constituting a charging port, while the outer end 37 of the valve member 33 is outwardly flared forming a foot and being positioned within the said charging port 35 is adapted to rest upon the funnel-shaped inner end 38 of the said charging ports during the admission of air through the valve during the charging operation.

An axially arranged air port 39 extends through the valve shaft 33 and communicates with the valve head surface 36 by a plurality of angularly arranged ports 40 positioned through the said head 35. It will be seen that the present valve structure may be assembled by providing the valve shaft 33 of the desired diameter and provided with the axial bore 39 herein referred to and then positioned through the bore 30 of the barrel 29 and whereupon the outwardly flaring of the outer end of the said shaft in the formation of the afore-mentioned foot 37 will retain the valve member 32 and the valve cage or barrel 29 assembled and with the valve member operatively shiftably positioned.

The outer end of the barrel 29 is externally provided with a hexagonal wrench-hold surface 41 and has the usual internally screw-threaded portion 42 adapted for the reception of the threaded nipple of an air pump hose or other air compressing and inflating device.

A dust proof cap 43 is threaded over the outer end of the barrel 29 and is provided with any desired form of wrench-hold surface 44.

In the operation of the device, the valve member 32 is firmly locked in its normally closed position by inwardly screwing the barrel 29 thereby forcibly engaging the valve seat 31 thereof against the valve head surface 36 and thus closing the charging port branches 40, while at the same time forcing the outer end 45 of the valve head 34 into closed engagement with the inner valve seat 28. The said seats 28 and 31 being in the form of ground valve seats, the forcible connection between the valve head and the barrel 29 upon one side and the cylinder projection 25 upon the other affords a completely fluid-tight seal for the valve and closes the same against the passage of any fluid therethrough in either direction.

A releasing of the barrel 29 from its locking engagement heretofore referred to by a slight outward movement thereof allows the pressure of any air within the container or chamber portion 24 controlled thereby to pass through the port 27 and exert its pressure within the valve chamber 26 upon the exterior surface of the main portion of the head 34 and such surface being greatly in excess of that engaged by the atmosphere entering through the ports 39—40 allows the outgoing fluid to force the valve head surface 36 against the funnel valve 31 and thus closing the valve against the exit of the fluid, the elements being then positioned as illustrated in Fig. 4 of the drawings.

With the locking barrel in its released position, the inflating device such as an air pump may be connected up with the screw-threaded bore of the barrel and air forced through the charging port 35 and thence through the valve portions 39—40 where the incoming air will engage the barrel seat 31 and will by reason of this engagement as well as the force of the air act to unseat the valve head 34 from the barrel seat 31 thus allowing the entrance of air, the elements being arranged as illustrated in Fig. 3 of the drawings.

In employing the device with the shock-absorber as illustrated in Fig. 1, the chamber portions 24 at the opposite ends of the piston 11 are inflated with air to the desired degree of pressure and both of the said valves locked in their closed positions by means of the turn barrel 29. The operation of the shock absorber being in the usual manner, it will be noted that the non-leaking valves provided at the opposite ends of the cylinder 10 prevents the escape of air from the cylinder and this maintains the cushioning effect upon the piston 11 and the weight which is mounted upon the supporting pin 22 carried thereby. With the valves locked in their closed positions, the dust-proof caps 43 are then screwed-down upon the barrels 29 into air-tight seating engagement with the outer faces of the bosses 15, thus further insuring the air-tight seal for the recharging valve.

While the form of the invention herein shown and described is what is believed to be the preferred embodiment thereof, it is nevertheless to be understood that minor changes may be made therein without departing from the spirit and scope of the invention as set forth in the claims.

What I claim as new is:—

1. In a fluid charging valve, a valve-receiving head having an interiorly-threaded chamber and an inlet port, said head having a valve seat at the entrance to said inlet port, a valve-carrying member threaded in said chamber having a bore therethrough and formed at its inner end around said bore with a valve seat, a valve having a hollow stem reciprocable in said bore and in engagement therewith throughout its length, said valve having radial outlet ports communicating with the bore of the stem and having seating faces for engagement respectively with the valve seat on the valve carrying member and the valve seat of the head, and a conical extension carried by the outer end of the hollow valve stem adapted to engage the valve carrying member to be limited in its inward movement.

2. In a fluid charging valve, a head having a chamber and a fluid inlet port leading from the inner end of said chamber, a valve-carrying member adjustably mounted in said chamber and having a central bore, a valve seat formed on the inner end of said member around the bore, a valve having a face for engaging said seat and a face for closing the inlet port of the head, a hollow valve stem slidable in the bore of the carrying member and engaging the same throughout its length, the valve having an outlet port leading from the bore of the valve stem.

3. In a fluid charging valve, a head having a chamber, an inlet port extending through the head from the inner end of said chamber, a valve seat surrounding said port at the inner end of the chamber, a valve carrying member threaded into said chamber, and having a bore therethrough, a valve seat formed on the inner end of said member around the bore, a valve having oppositely tapered faces for engaging respectively with the valve seat on the valve-carrying member and the valve seat around the inlet port, a hollow stem carrying the valve extending through the valve carrying member and frictionally engaging the same, the valve having an outlet communicating with the bore of the stem.

4. In a fluid charging valve, a valve carrying member having a bore and provided at opposite ends of the bore with valve seats, a conical valve having a face for engagement with the seat on the inner end of the carrying member, a hollow stem reciprocable in the bore of the carrying member and having a head on the outer end for engaging the valve seat at the outer end of the bore in said carrying member, the said stem frictionally engaging the bore, said valve having outlet ports leading from the bore of said stem.

5. In a fluid charging valve, a chambered receiving head having an inlet port and a valve seat therearound, a valve carrying member threaded into the chamber of said head and having a bore therethrough, a valve seat on the inner end of said member around the bore, a valve having faces for simultaneous engagement with the valve seats of the carrying member and head respectively and having an outlet port opposite the seat on the carrying member, and a hollow stem carrying said valve and reciprocable in the bore of the carrying member, and in frictional contact therewith.

In testimony whereof I affix my signature.

REINHOLD HERMAN.

Witnesses:
A. E. HOLLIDAY,
ERNEST PAYNE.

Copies of this patent may be obtained for five cents each, by addressing the "Commissioner of Patents, Washington, D. C."